Patented May 9, 1933

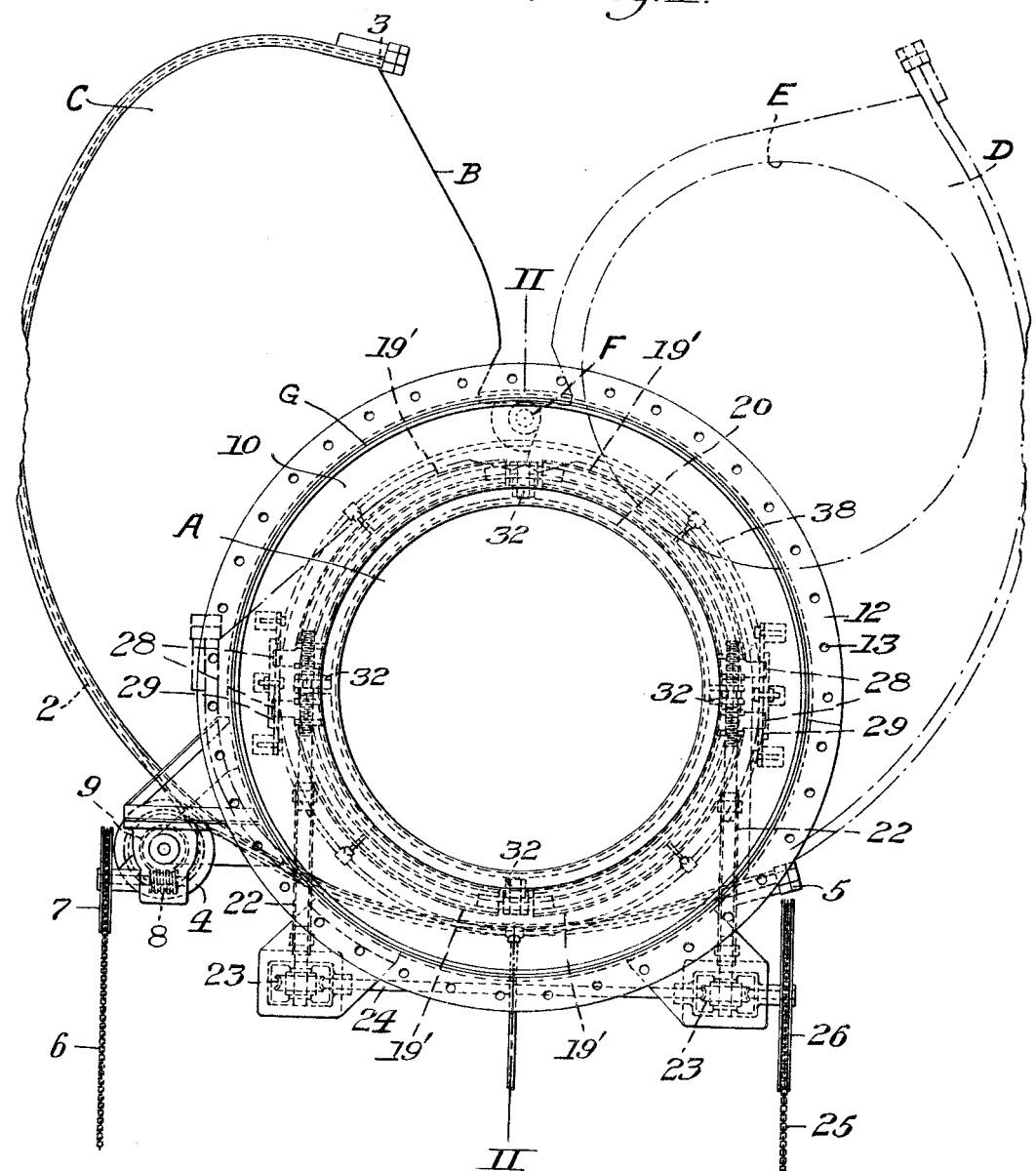

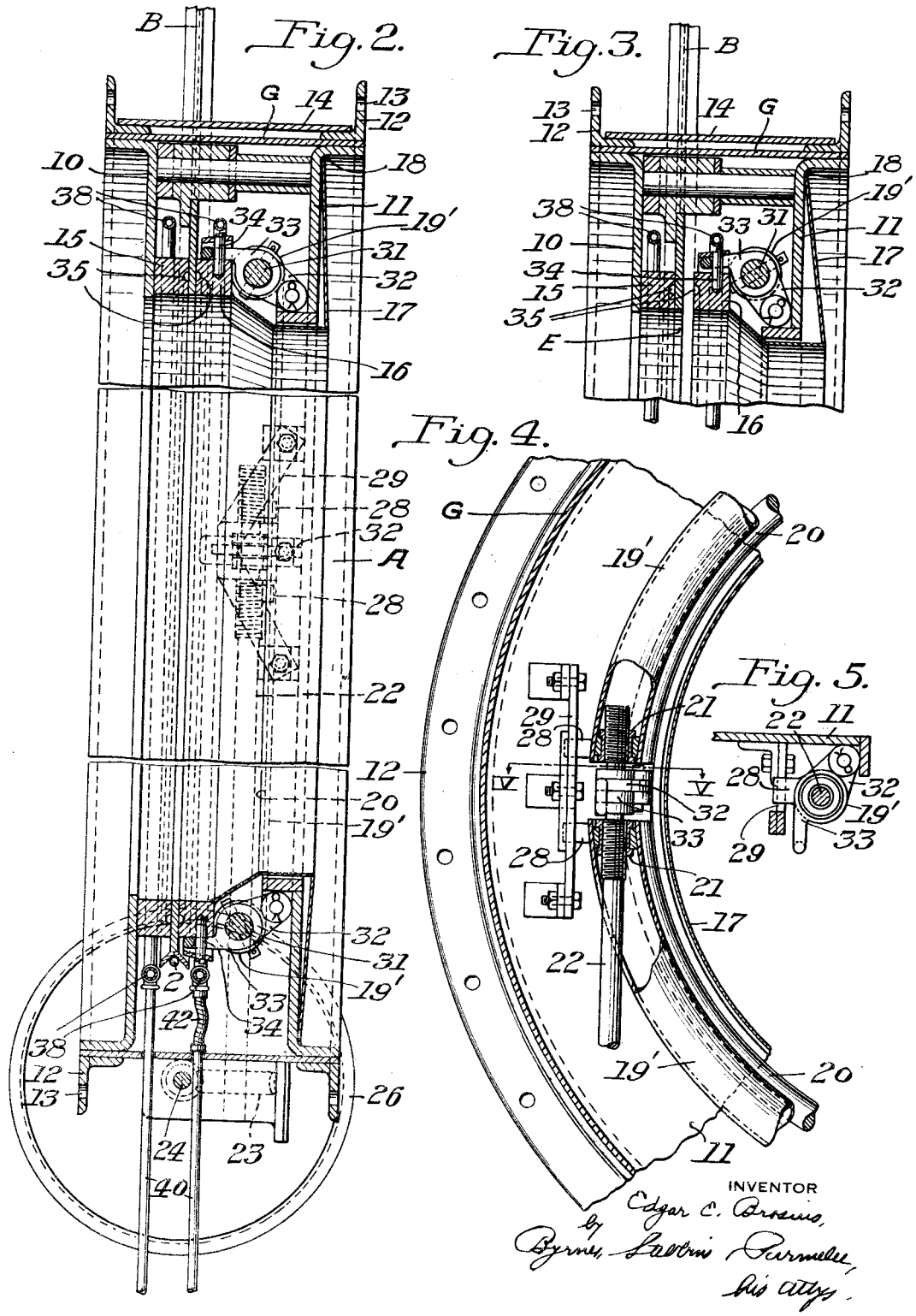

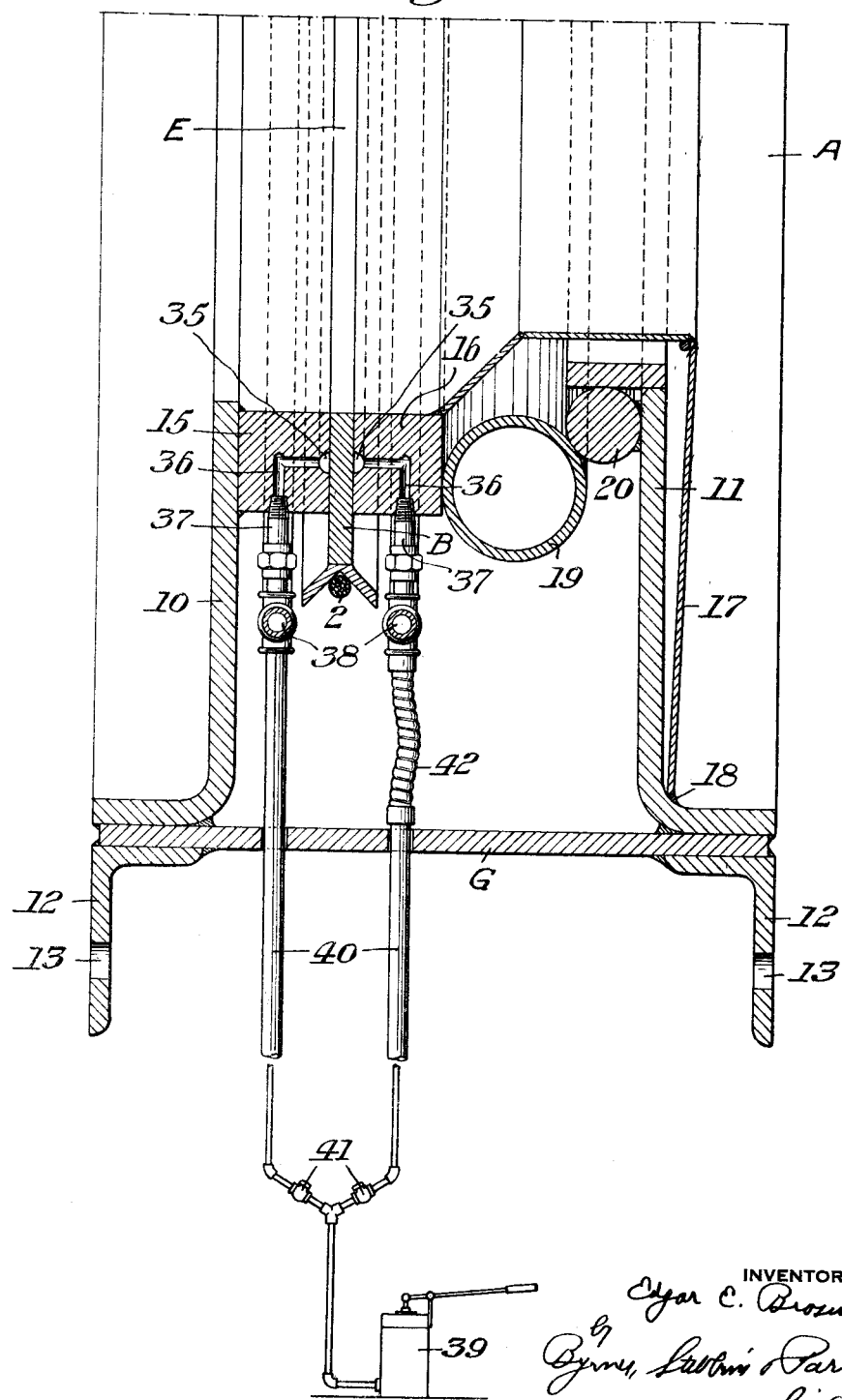

1,907,730

UNITED STATES PATENT OFFICE

EDGAR E. BROSIUS, OF PITTSBURGH, PENNSYLVANIA

VALVE

Application filed December 31, 1928. Serial No. 329,526.

This invention relates generally to valves, and more particularly to valves especially adapted for use in connection with large gas conduits or mains such as utilized in the handling of gases incident to the operation of blast furnaces, hot blast stoves, ovens, gas producers and the like, although the utility of the invention is not limited with respect to its use.

It is customary in the handling of gases of the character referred to, to employ large mains. Periodically, usually at more or less infrequent intervals, it becomes desirable or necessary to cut off the flow of gas through such conduits. For this purpose it has been customary in the art to utilize so-called "goggle valves". Such valves embody an imperforate portion which when in position across the main or conduit is effective for closing the same against the flow therethrough of any gases, and with a perforate portion, usually comprising a single large opening, which when in registry with the flow opening through the conduit, permits the desired passage of the gases.

It has been found very difficult in practice to prevent these so-called "goggle valves" from leaking. Leaking of these valves may be caused due to any one of a number of reasons, among which may be mentioned the warping of the valve disk or inaccurate machining thereof.

Due also to the infrequent periods at which the valves are operated, they frequently stick more or less tightly, thereby causing considerable difficulty and requiring special and more or less drastic measures to effect their release.

In accordance with my invention, I overcome any tendency of the valve to leak by providing means for supplying a film of oil or other sealing fluid to the joints between the valve disk and valve seat. In cases where the valve disk has not been machined to absolute accuracy, or in cases where the valve disk has warped slightly, the crevices ordinarily formed are filled with oil or with oil mixed with dust carried by the gas. This forms a seal through which no gas can escape. It also provides lubrication of such nature as to insure more or less easy operation.

In the accompanying drawings, which illustrate the present preferred embodiment of my invention:—

Figure 1 is a front elevation of the valve showing the means for operating the valve disk.

Figure 2 is a section taken on the line II—II of Figure 1, showing the movable valve seat in closed position.

Figure 3 is a sectional view of a part of the valve structure shown in Figure 2, showing the movable valve seat in open position.

Figure 4 is an enlarged view showing the means for operating the movable valve seat.

Figure 5 is a section on the line V—V of Figure 4, and

Figure 6 is a sectional view, on an enlarged scale, showing the means for supplying the sealing fluid to the joints between the valve disk and valve seats.

Referring to the drawings, the gas flowing through the opening A in the conduit is controlled by a "goggle valve" having a disk indicated generally by the reference character B. The valve disk includes an imperforate portion C and a portion D having an opening E therein. When the valve disk is in the full line position indicated in Figure 1, the opening E coincides with the opening A in the gas conduit, thereby allowing gases to flow freely through the valve. When the valve disk is in the chain line position shown in the same figure, the imperforate portion C closes the opening A in the gas conduit. In order to rotate the disk about its pivot point F to the different positions indicated in Figure 1, it is provided on its periphery with a cable 2 having one end secured to the disk at 3. The cable passes around a drum 4 and has its opposite end connected to the disk at 5. The drum may be rotated by means of the chain 6, sprocket wheel 7, worm 8 and worm wheel 9, to thereby rotate the valve from one position to the other.

As shown more particularly in Figures 2 to 6, there are provided heads 10 and 11 welded at their outer edges to a sectional casing G.

This casing is connected to the conduit sections by means of flanges 12 provided with openings 13 for cooperation with similar flanges on the conduit sections. The flanges 12 are tied together by braces 14. The inner edge of the head 10 carries a relatively fixed valve seat 15. A valve seat 16 which is relatively movable is carried by a flexible plate 17 welded at 18 to the head 11.

The heads are conveniently in the form of pressed steel or flanged plates, not only because of the greater ease and accuracy of manufacture, but also because of the relatively compact and light weight construction thus afforded.

Relative movement between the valve seats 15 and 16 is accomplished through the expansion and contraction of a substantially annular pipe 19 made up of the quadrants 19'. As shown in Figure 6, this annular pipe is arranged between an annular rod 20 secured to the head 11, and the outer face of the movable valve seat 16. As the pipe 19 contracts, it rides upwardly over the rod 20, as viewed in Figure 6, and produces a wedging action against the outer face of the valve seat 16 effective substantially in axial alignment with the seats, thereby causing the valve seats to move toward each other and to contact tightly with the valve disk B. As the pipe 19 expands and rides downwardly, it releases the valve seat 16 and permits it to move away from the seat 15 so that the valve disk can be rotated to open or closed position.

The change in the effective diameter of the pipe 19 is accomplished by the means shown in Figures 1 and 4. The ends of the pipe sections 19' at the sides of the valve structure carry oppositely threaded nuts 21 which receive threaded shafts 22. These shafts are rotated by worm wheels 23 mounted thereon and meshing with worms on a shaft 24. The shaft 24 is rotated by means of a chain 25 passing around a sprocket wheel 26 connected to the shaft. Rotation of the shafts 22 in one direction causes the ends of the pipe to approach each other, while rotation in the opposite direction causes the ends to spread apart. When the pipe 19 contracts, it wedges between the rod 20 and the outer face of the movable valve seat 16 to cause the valve seat 16 to approach the fixed valve seat 15.

In order to cause the pipe 19 to move axially of the conduit when the pipe expands, the cam arrangement shown in Figures 1, 2, and 4 is employed. The adjacent ends of the pipe sections 19' at the sides of the valve structure are provided with cams 28 which cooperate with a cam track 29 during movement of the ends of the pipe sections. As shown in Figure 2, the cam track 29 is so shaped that as the pipe expands it is moved axially of the conduit in a direction away from the fixed valve seat 15.

The pipe sections 19' are inter-connected at the top and bottom of the valve structure by pins 31. As shown in Figures 2 and 3, links 32 are pivoted at one end to the pins 31 or screw shaft 22, and at their opposite ends to bearings welded to the head 11. Links 33 are connected at one end to the pins 31 and at their opposite ends to the movable valve seat 16 by studs 34.

When the sprocket wheel 26 is rotated, it causes the sections of the annular pipe 19 to expand or contract. As the pipe expands, it is guided by the cams 28 running in tracks 29 so that the pipe 19 is pulled axially of the conduit away from the fixed valve seat 15. The pipe 19 is guided during expansion or contraction by the links 32, and the movement of the pipe is transmitted to the movable valve seat 16 through the links 33 to cause it to move relatively to the fixed valve seat 15, and thus "crack" open the valve. Movement of the valve seat 16 is permitted because of the flexibility of the plate 17 which carries the seat, and seals it against leakage.

In order to provide a tight seal for the valve when in closed position, the arrangement shown particularly in Figures 1, 2 and 6 is utilized. Each of the valve seats 15 and 16 which have wide seating surfaces, as can be seen from Fig. 6, is provided with a substantially annular groove 35 in its seating face. These grooves are connected by passages 36 and pipes 37 to annular pipes or headers 38 arranged adjacent the periphery of the valve structure. These headers 38 are connected to a grease or oil compressor 39 by the pipes 40 having suitable valves 41 arranged to control the flow therethrough. The pipe 40 connecting the movable valve seat 16 with the source of oil supply may be provided with a flexible portion 42, to permit free movement of such seat.

The sealing fluid which I prefer to employ is a very heavy oil having a flash point of about 610° F. and a firing temperature of about 700° F. The oil when subjected to the heat of the gases flowing through the gas conduit becomes thinner and forms a film in the joints between the valve disk and valve seats. Any slight leak which might otherwise be present due to warping of the valve members or inaccurate machining thereof is filled with the film of oil, and if the gases contain dust, it, together with the oil, aids in forming a tight seal. It will be understood that the kind of oil employed will be determined by the temperatures prevailing in the gas, and that the oil simply forms a seal between the valve disk and valve seats and does not flow into the gas conduit. Not only does the pressure under which such sealing fluid is supplied tend to produce the necessary distribution and penetration thereof, but as its viscosity lowers under the temperature conditions prevailing, capillary action assists in the obtaining of the desired results. It will be understood that the term "fluid" in this connection is used, as denoting any fluid or semi-solid substance or material having the characteristics set forth and capable of being utilized for sealing purposes. Preferably, however, in addition to its sealing characteristics, it should also possess lubricating and heat resisting properties with the ability of forming a more or less uniform film-like coating.

Instead of providing the valve seats with annular grooves, I may, if desired, form grooves in the faces of the valve disk and supply oil to these grooves in a manner similar to that already described.

In large valves used for the purpose hereinabove described, the difficulty of providing against leakage due to inaccuracies in machining the valve elements or to warping of the elements is overcome, according to my invention, by providing an oil seal between the surfaces of the valve elements.

Likewise, the difficulties usually incident to the operation of such valves are effectively obviated.

The present invention also obviates the difficulties which have heretofore been encountered in obtaining tight sealing of the valve in the presence of the dirt and other foreign particles, such as flue dust and the like, present in the lines being controlled. In actual practice it has been found that such foreign material tends to collect more or less under the action of the oil film provided and thereby form a cushion against which the valve may seat. This not only insures tighter seating, but also prevents cutting of the valve itself under the action of the seats and the movement necessary during the valve operation.

The oil film in time also tends to extend completely over the opposite sides of the valve, and provide a film which is effective for very materially reducing oxidation. In addition to this, the presence of the oil maintains the foreign material in a more or less flaky or loose condition and prevents the cementing action which has heretofore taken place.

I have illustrated and described the present preferred embodiment of my invention. It is to be understood, however, that the invention may be otherwise embodied without departing either from the spirit of the invention or the scope of the following claims.

I claim:—

1. A valve comprising a pair of relatively movable substantially annular aligned valve seats, a movable valve cooperating therewith, means effective substantially in line with said seats for effecting relative movement thereof, said means including an annular member with means for varying its effective diameter, and means for supplying fluid to the joints between the movable valve and seats for sealing the valve.

2. In a valve, a gate member, a seat movable relative thereto, a contractible ring for moving said seat, and lubricant supply means for said seat.

3. In a valve, a gate member, a seat movable relative thereto, a segmented, contractible ring for shifting the seat relative to the gate member, means for contracting and expanding said ring, and lubricant supply means for said seat.

4. A goggle valve, comprising a pair of spaced seats one movable relatively to the other and each affording a wide seating surface, a movable valve between said seats, and means for supplying and maintaining a wide film of oil between said seats and valve.

5. A goggle valve, comprising a pair of spaced seats one of which is movable relatively to the other and each affording a wide seating surface for a valve, a valve between said seats movable at substantially right angles to the direction in which said seats are relatively movable, and means including a flexible connection for supplying and maintaining a wide film of oil between said seats and valve.

In testimony whereof I have hereunto set my hand.

EDGAR E. BROSIUS.